United States Patent
Yokokura

(10) Patent No.: US 9,268,628 B2
(45) Date of Patent: Feb. 23, 2016

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Hidenori Yokokura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/772,133

(22) Filed: Feb. 20, 2013

(65) Prior Publication Data

US 2013/0227358 A1 Aug. 29, 2013

(30) Foreign Application Priority Data

Feb. 23, 2012 (JP) .................................. 2012-037145

(51) Int. Cl.
- G06F 11/00 (2006.01)
- G06F 11/07 (2006.01)
- G06F 11/30 (2006.01)
- G06F 3/12 (2006.01)

(52) U.S. Cl.
CPC ........ G06F 11/0769 (2013.01); G06F 11/0733 (2013.01); G06F 11/0748 (2013.01); G06F 11/0787 (2013.01); G06F 3/122 (2013.01); G06F 3/1273 (2013.01); G06F 3/1288 (2013.01); G06F 11/3013 (2013.01); G06F 11/3072 (2013.01); G06F 11/3086 (2013.01)

(58) Field of Classification Search
USPC .......................................................... 714/48
See application file for complete search history.

(56) References Cited

U.S. PATENT DOCUMENTS

| | | | |
|---|---|---|---|
| 6,430,711 B1 * | 8/2002 | Sekizawa | 714/47.2 |
| 6,604,212 B2 * | 8/2003 | Sekizawa | 714/47.2 |
| 6,681,349 B2 * | 1/2004 | Sekizawa | 714/47.2 |
| 6,735,641 B1 * | 5/2004 | Kobayashi et al. | 710/15 |
| 7,383,474 B2 * | 6/2008 | Sekizawa | 714/57 |
| 8,194,273 B2 * | 6/2012 | Yokokura | 358/1.15 |
| 2003/0212929 A1 * | 11/2003 | Sekizawa | 714/47 |
| 2005/0165929 A1 | 7/2005 | Motoyama | |
| 2009/0013026 A1 * | 1/2009 | Oyobe | 709/201 |
| 2009/0063900 A1 * | 3/2009 | Yoshida | 714/20 |
| 2009/0076640 A1 | 3/2009 | Nakamura | |
| 2010/0005352 A1 * | 1/2010 | Yokokura | 714/748 |

FOREIGN PATENT DOCUMENTS

| | | |
|---|---|---|
| CN | 1815451 A | 8/2006 |
| CN | 101315611 A | 12/2008 |
| CN | 101320348 A | 12/2008 |
| CN | 101571827 A | 11/2009 |
| CN | 102291508 A | 12/2011 |
| JP | 2001-309454 A | 11/2001 |
| JP | 2002-082792 A | 3/2002 |
| JP | 2005-253025 A | 9/2005 |
| JP | 2007-034416 A | 2/2007 |
| JP | 2009-070279 A | 4/2009 |
| JP | 2009-110318 A | 5/2009 |

* cited by examiner

*Primary Examiner* — Kamini Patel
(74) *Attorney, Agent, or Firm* — Canon U.S.A., Inc. IP Division

(57) ABSTRACT

An image forming apparatus transmits a log thereof relating to a status detected thereby to a log collection server, and sets a storage period of each transmitted log in the log collection server. The image forming apparatus acquires a total amount of logs thereof stored in the log collection server and a storage period of each log from the log collection server, and deletes the log thereof stored in the log collection server based on the storage period of each log before transmitting a log if a sum total including the total amount and a total amount of logs to be transmitted reaches an upper limit.

10 Claims, 11 Drawing Sheets

FIG.4

| ERROR CODE | PRIORITY LOG | TRANSMISSION TARGET 0 = NOT TRANSMIT 1 = TRANSMIT | STORAGE PERIOD |
|---|---|---|---|
| E733-0001 | LOG_PRINTER_*.TXT | 1 | 30 DAYS |
| E611-0001 | LOG_FAX_*.TXT | 1 | 30 DAYS |
| E001-0001 | N/A | 0 | 0 |
| OTHER | LOG_USER_*.TXT | 1 | 30 DAYS |
| OTHER | LOG_GENERAL_*.TXT | 1 | 7 DAYS |

| | | | |
|---|---|---|---|
| 5-2 | https://kanri.xxxxx.co.jp/portal/log.html | | |
| 5-3 | SETTING TRANSMISSION | | |
| 5-4 | LOG TRANSMISSION | ● TRANSMIT ○ NOT TRANSMIT | |
| 5-5 | ACCOUNT | | |
| 5-6 | PASSWORD | | |
| 5-7 | URL | http://172.24.177.1/webdav | |
| 5-8 | TRANSMISSION CONDITION | | |
| 5-9 | TARGET DATE | 2011/1/1~2011/7/1 | |
| 5-10 | ERROR FILTER | ● YES ○ NO | |

| | ERROR CODE | PRIORITY LOG (5-12) | TRANSMISSION TARGET (5-13) | STORAGE PERIOD (5-14) |
|---|---|---|---|---|
| 5-11 | E733-0001 | LOG_PRINTER_*.TXT | TRANSMIT | 30 DAYS |
| | E611-0001 | LOG_FAX_*.TXT | TRANSMIT | 30 DAYS |
| | E001-0001 | | NOT TRANSMIT | – |
| | OTHER | LOG_USER_*.TXT | TRANSMIT | 30 DAYS |
| | OTHER | LOG_GENERAL_*.TXT | TRANSMIT | 7 DAYS |

FIG.6

■ PERIOD OF VALIDITY 30 DAYS ■ ~6-1
LOG_USER_20120101110901.TXT
LOG_USER_20120101110920.TXT
LOG_USER_20120101110940.TXT
LOG_PRINTER_20120101110950.TXT

■ PERIOD OF VALIDITY 7 DAYS ■ ~6-2
LOG_GENERAL_20120101121101.TXT
LOG_GENERAL_20120101121120.TXT
LOG_GENERAL_20120101121140.TXT
LOG_GENERAL_20120101121150.TXT
LOG_GENERAL_20120101121201.TXT

FIG.8A 8-1

```
<env:Envelope
xmlns:env="http://schemas.xmlsoap.org/soap/envelope/"
env:encodingStyle="http://schemas.xmlsoap.org/soap/encoding/">
<env:Body>
  <ns:getLogCondition xmlns:ns="rdsgw">
   <client>
    <id>100</id>
    <type>type A</type>
    <appVersion>1.00</appVersion>
   </client>
    <device>
     <mac>85:33:f2:2a</mac>
     <ip>192.168.0.1</ip>
     <serialNumber>serial:AAABBBB</serialNumber>
     <productName>real new device..</productName>
     <type>type A</type>
    </device>
  </ns:getLogCondition>
 </env:Body>
</env:Envelope>
```

FIG.8B 8-2

```
<SOAP-ENV:Envelope xmlns:SOAP-
ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns:getLogCondition xmlns:ns1="rdsgw" SOAP-
ENV:encodingStyle="http://schemas.xmlsoap.org/soap/encoding/">
<available>1</available>
<condition>
  <startDate>20110101</startDate>
  <endDate>20110701</endDate>
  <logFilterList>
   <logFilter>
     <errorCode>E733-001</errorCode>
     <file>LOG_PRINTER*.*</file>
     <send>ON</send>
     <retention>30days</retention>
     <errorCode>E611-001</errorCode>
     <file>LOG_FAX*.*</file>
     <send>ON</send>
     <retention>30days</retention>
     <errorCode>E001-001</errorCode>
     <file>none</file>
     <send>OFF</send>
     <errorCode>OTHER</errorCode>
     <file>LOG_USER*.*</file>
     <send>ON</send>
     <retention>30days</retention>
     <errorCode>OTHER</errorCode>
     <file>LOG_GENERAL*.*</file>
     <send>ON</send>
     <retention>7days</retention>
   </logFilter>
  </logFilterList>
</condition>
<errorCode>
</ns:getLogConditionResponse>
</SOAP-ENV:Body>
</SOAP-ENV:Envelope>
```

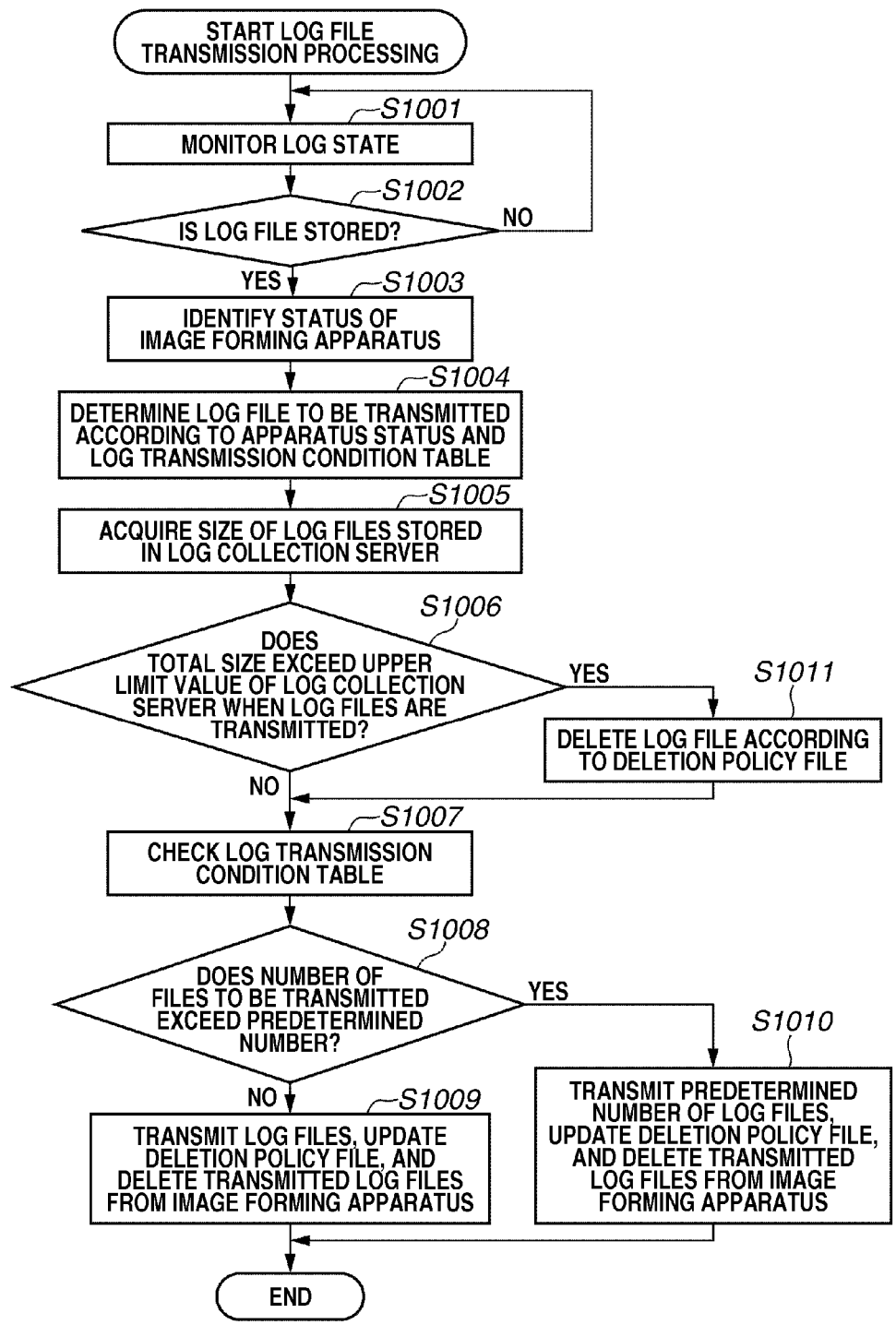

IMAGE FORMING APPARATUS, CONTROL METHOD FOR IMAGE FORMING APPARATUS, AND STORAGE MEDIUM

BACKGROUND OF THE INVENTION

1. Field of the Invention

The present invention relates to log transmission control of an image forming apparatus connected to a network.

2. Description of the Related Art

A system for transmitting various logs stored inside an image forming apparatus to a log collection server and promptly checking the logs by accessing the log collection server from a remote place has recently been developed.

Herein, the log is, for example, an image log dealt with by a system such as a security monitoring system, and a sequence log for detecting a problem of a device. These logs are managed on the log collection server.

Japanese Patent Application Laid-Open No. 2005-253025 discusses a system in which a certain elapsed-time log (e.g., 30-day-old log) is deleted since a hard disk on a server has a capacity limit.

Development of such a system is expected to advance further over the next years.

However, there are cases where a large amount of sequence logs are generated within a short time (within a few days), for example, due to abnormality of an image forming apparatus. In such a case, if logs are continuously transmitted to a log collection server, a hard disk capacity of the log collection server is compressed. (In other words, deletion of a certain elapsed-time log may not be enough for its recovery.)

Moreover, there are cases where data in the log collection server needs to be deleted when a volume of log data stored in the log collection server reaches a certain size. In such a case, there is a possibility that an important log may be deleted simultaneously.

SUMMARY OF THE INVENTION

The present invention can cause a log necessary to analyze a state of an image forming apparatus to be stored in a server apparatus without compressing a storage resource of a log collection server even when a large number of logs are generated in the image forming apparatus.

According to an aspect of the present invention, an image forming apparatus communicating with a log collection server via a network includes a storage device configured to store a log file in which a log of the image forming apparatus is written, a registration unit configured to register information identifying an abnormal state of the image forming apparatus as a transmission condition of the log file, a detection unit configured to detect the abnormal state of the image forming apparatus, a determination unit configured to determine whether the information identifying the abnormal state detected by the detection unit is registered as a log transmission condition, and a transmission unit configured to transmit the log file stored in the storage device to the log collection server when the determination unit determines that the information identifying the detected abnormal state is registered.

According to the present invention, even when a large number of logs are generated in the image forming apparatus, a log necessary to analyze a state of the image forming apparatus can be stored in the server apparatus for a necessary period of time without compressing a storage resource of the server apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a diagram illustrating one example of a log transmission condition table registered as a transmission condition for transmitting a log file.

FIG. 5 is a diagram illustrating one example of a screen used to set the log transmission condition table.

FIG. 6 is a diagram illustrating one example of a deletion policy file indicating a deletion policy according to the exemplary embodiment of the present invention.

FIG. 8A is a diagrams illustrating one example of XML/SOAP data, which indicates an acquisition request for a log transmission condition, to be transmitted from the image forming apparatus to a monitoring server, whereas FIG. 8B is a diagram illustrating one example of XML/SOAP data, which indicates a log transmission condition, to be transmitted from the monitoring server to the image forming apparatus.

FIG. 10 is a flowchart illustrating one example of processing executed in the image forming apparatus to transmit a log file.

DESCRIPTION OF THE EMBODIMENTS

Various exemplary embodiments, features, and aspects of the invention will be described in detail below with reference to the drawings.

Figure 1:
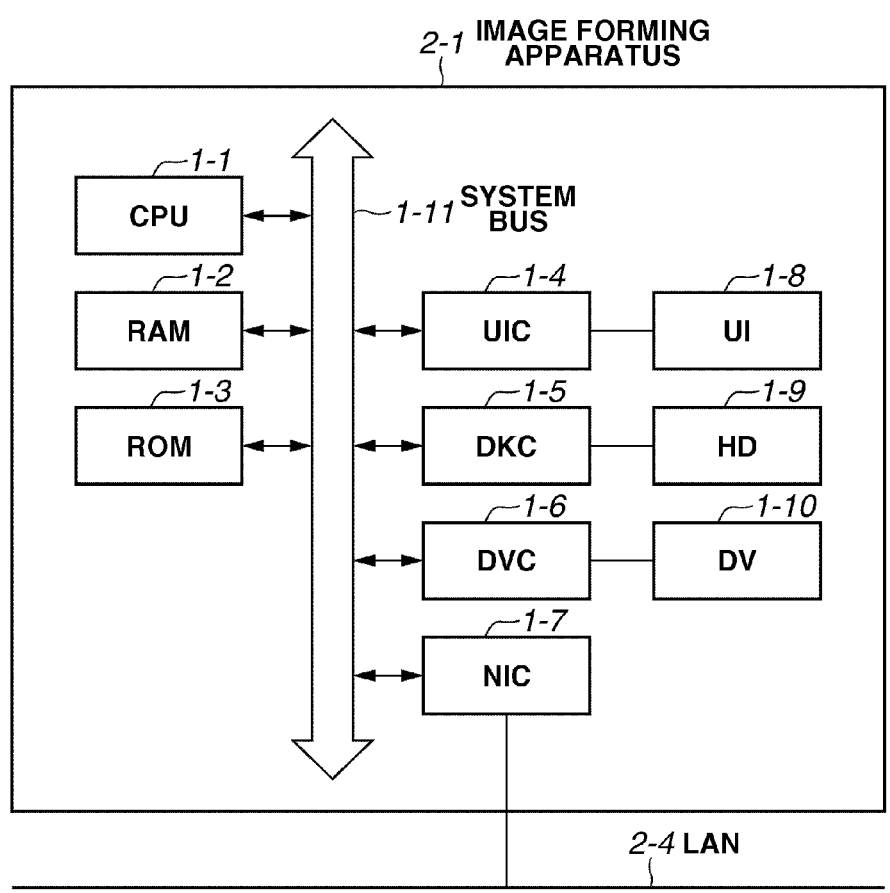
FIG. 1 is a diagram illustrating one example of an internal configuration of an image forming apparatus according to an exemplary embodiment of the present invention.

FIG. 1 is a diagram illustrating one example of an internal configuration of an image forming apparatus according to an exemplary embodiment of the present invention.

An image forming apparatus 2-1 according to an exemplary embodiment of the present invention is illustrated in FIG. 1. The image forming apparatus 2-1 operates when a network control function and a device (printer) control function are operated in a central processing unit (CPU) 1-1.

The CPU 1-1 executes a computer readable program stored in a read only memory (ROM) 1-3, thereby collectively controlling each of devices connected to a system bus 1-11.

A random access memory (RAM) 1-2 functions as a main memory and a work area of the CPU 1-1. The RAM 1-2 includes a backup RAM for storing a transmission condition table, for example.

A user interface (UI) 1-8 is an operation unit including a hard key and a display device with a touch panel. A user interface controller (UIC) 1-4 controls a display to the UI 1-8 and an input operation from the UI 1-8. A user can perform an operation such as a copy setting with respect to the image forming apparatus 2-1 by using the UI 1-8.

A disk controller (DKC) 1-5 controls a hard disk (HD) 1-9 for storing an image, various user data, and a log file in which a log of the image forming apparatus 2-1 is written.

A device controller (DVC) 1-6 controls a device (DC) 1-10. The device 1-10 is particularly a scanner device for optically reading a document and inputting the document as image data, and a printer device for printing an image on a print medium such as a sheet based on the image data.

In the present exemplary embodiment, for example, log files such as "LOG_PRINTER_*.TXT", "LOG_FAX_*.TXT", "LOG_USER_*.TXT", and "LOG_GENERAL_*.TXT" are stored in the HD 1-9.

The CPU 1-1 generates a new log file and then writes the new log file into the HD 1-9, for example, when usage of the image forming apparatus 2-1 is changed under a predetermined condition. In a portion with a symbol "*" of each log file, a date and time of generation of the log file is actually set. However, consecutive numbers may be set in portions with the symbol "*" of log files such that "LOG_USER_01.TXT", "LOG_USER_02.TXT", and "LOG_USER_03.TXT" are set in the HD 1-9.

The "LOG_PRINTER_*.TXT" log file is a file of logs relating to usage of a printer. The "LOG_FAX_*.TXT" log file is a file of logs relating to usage of a facsimile apparatus. The "LOG_USER_*.TXT" log file is a file of logs relating to setting changes in the image forming apparatus 2-1.

The "LOG_GENERAL_*.TXT" log file is a file in which general logs common to all the functions of the image forming apparatus 2-1 are written. In addition, logs of transmitting/receiving packets to flow via a network, or a log of an application installed in the image forming apparatus 2-1 are stored as a log file in the HD 1-9.

In each log file, a file name by which a log type can be identified is set as described above. Consequently, when an error is analyzed (i.e., when a log file is acquired from a log collection server 2-12 illustrated in FIG. 2), which log file to be checked can be readily identified in response to an occurrence of the error.

A network interface card (NIC) 1-7 connects the image forming apparatus 2-1 to a local area network (LAN) 2-4. The image forming apparatus 2-1 communicates with an external server and other devices via the LAN 2-4. Various setting values including an Internet Protocol (IP) address and a communication port may be stored in the backup RAM of the RAM 1-2 or another storage device such as the HD 1-9.

Moreover, the image forming apparatus 2-1 of the present exemplary embodiment may include a keyboard. The image forming apparatus 2-1 may not necessarily include the HD 1-9. Another storage device such as a universal serial bus (USB) memory may be employed instead of the HD 1-9 as long as data can be stored.

Figure 2:
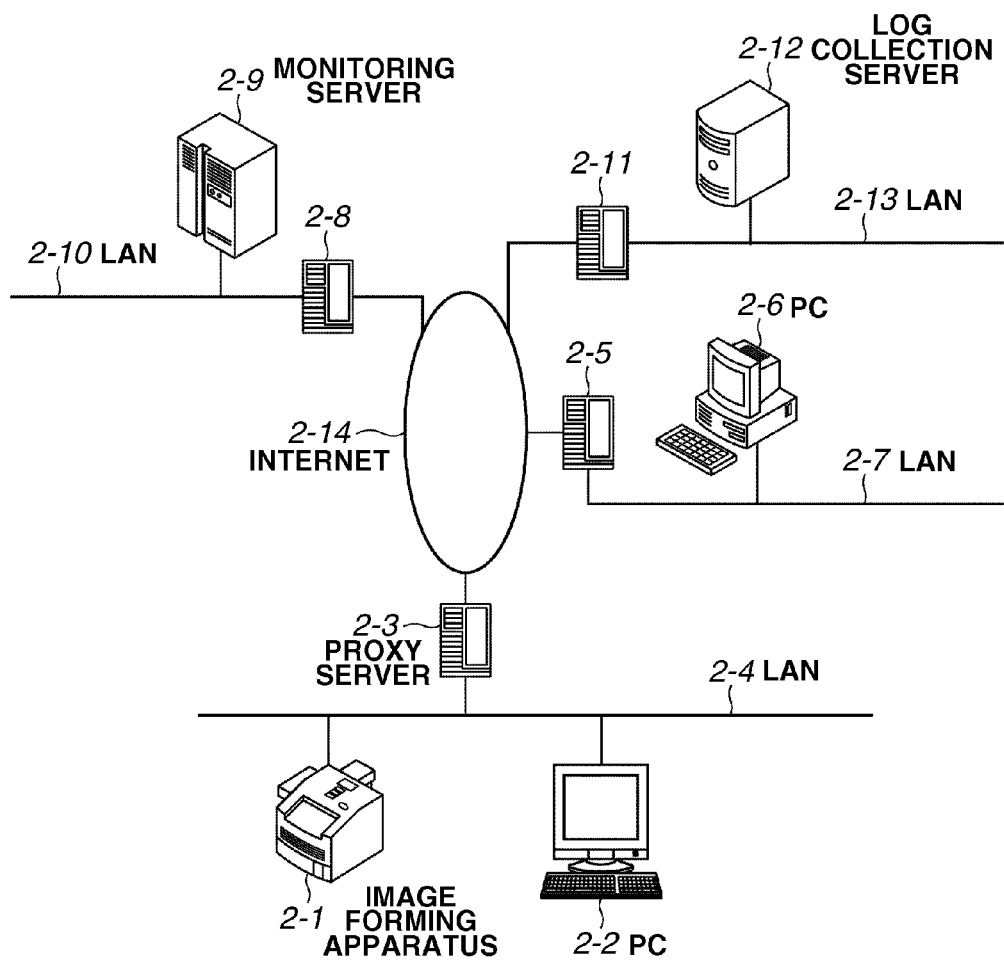
FIG. 2 is a diagram illustrating one example of the entire configuration of a system including the image forming apparatus of the present invention.

FIG. 2 is a diagram illustrating one example of the entire configuration of a system including the image forming apparatus 2-1 of the present invention.

In FIG. 2, the image forming apparatus 2-1 can communicate with various apparatuses via the LAN 2-4 and other networks. A personal computer (PC) 2-2 can instruct the image forming apparatus 2-1 to perform a print operation, and to monitor a status of the image forming apparatus 2-1 via the LAN 2-4. Moreover, the image forming apparatus 2-1 can access a monitoring server 2-9 via a web browser, so that a log transmission condition thereof can be set from a remote place.

In FIG. 2, LANs 2-4, 2-7, 2-10, and 2-13 are provided, and Internet 2-14 represents the entire Internet. Proxy servers 2-3, 2-5, 2-8, and 2-11 are connected to the Internet 2-14 as proxies for devices inside the respective LANs 2-4, 2-7, 2-10, and 2-13.

The monitoring server 2-9 monitors and controls an error of the image forming apparatus 2-1, and manages a transmission condition of a log file to be transmitted from the image forming apparatus 2-1 to the log collection server 2-12.

The log collection server 2-12 receives, retains, and manages the log file transmitted from the image forming apparatus 2-1 based on a web distributed authoring and versioning (WebDAV) protocol for the worldwide web (WWW). The log file retained and managed by the log collection server 2-12 is, for example, used for error analysis. For example, when an error occurs in the image forming apparatus 2-1, a service staff can acquire the log file retained and managed by the log collection server 2-12 via the Internet, thereby analyzing the error.

The WebDAV protocol is an expanded function of a hypertext transfer protocol (HTTP) and has high security. Consequently, the WebDAV protocol can be the most suitable protocol for the Internet. Moreover, the WebDAV protocol allows data generated by a client to be transmitted to a server and to be made public, and further allows a list of files or folders on the server to be acquired from the client. The WebDAV protocol also allows a file and a folder to be duplicated, moved, and deleted.

A PC 2-6 can use a web browser and access the monitoring server 2-9 and the log collection server 2-12 via the web browser.

In the present exemplary embodiment, assume that a network system including the image forming apparatus 2-1 is an Internet environment. However, other network environments such as an intranet may be used instead of the Internet environment. Moreover, a proxy server may not necessarily be provided inside the network system.

In addition, the number of each of devices, the number of servers, and the number of PCs are not limited to those described in the present exemplary embodiment. Although the log collection server 2-12 is arranged in the present exemplary embodiment, a protocol other than the WebDAV protocol may be employed (e.g., a server message block (SMB) protocol and a file transfer protocol (FTP) server may be employed). Moreover, the monitoring server 2-9 and the log collection server 2-12 may be arranged on the same server.

The PC 2-2, the PC 2-6, the monitoring server 2-9, the log collection server 2-12, and the proxy servers 2-3, 2-5, 2-8, and 2-11 have a configuration of a computer system known in the art (not illustrated).

Figure 3:
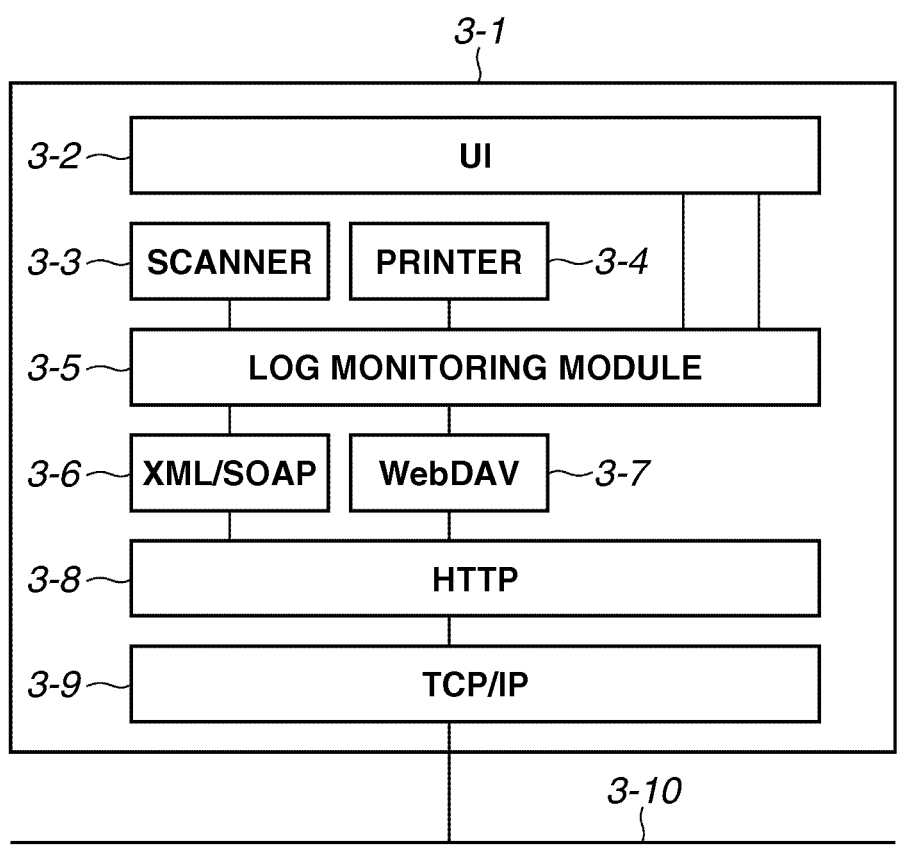
FIG. 3 is a configuration diagram illustrating an internal module provided inside the image forming apparatus according to an exemplary embodiment of the present invention.

FIG. 3 is a configuration diagram illustrating an internal module provided inside the image forming apparatus according to an exemplary embodiment of the present invention.

In FIG. 3, an entire image forming apparatus 3-1 represents the entire apparatus of the image forming apparatus 2-1. A user interface (UI) 3-2 corresponds to the UI 1-8 illustrated in FIG. 1. Each of a scanner apparatus 3-3 and a printer apparatus 3-4 corresponds to the DV 1-10 illustrated in FIG. 1.

A log monitoring module 3-5 is a software module for monitoring whether a log file is written. An extensible markup language/simple object access protocol (XML/SOAP) 3-6 is a software module for controlling a procedure for communicating with the monitoring server 2-9.

A WebDAV client module 3-7 is a software module for controlling a procedure for communicating with the log collection server 2-12. An HTTP client module 3-8 is a software module for controlling communications using an HTTP protocol.

The entire image forming apparatus 3-1 also includes a protocol stack 3-9 of a transmission control protocol/internet protocol (TCP/IP). A network 3-10 corresponds to the LAN 2-4 illustrated in FIG. 2.

Each of the software modules 3-5 through 3-9 is performed by executing a computer readable program recorded in the ROM 1-3 by the CPU 1-1 of the image forming apparatus 2-1.

FIG. 4 is a diagram illustrating one example of a table registered as a transmission condition of a log file, the table being stored in the monitoring server 2-9.

The transmission condition of the log file illustrated in FIG. 4 defines a log transmission condition in the image forming apparatus 2-1, that is, defines what conditions need to be satisfied to transmit a log file.

In the present exemplary embodiment, the table illustrated in FIG. 4 is stored in a hard disk of the monitoring server 2-9, and is regularly acquired by the image forming apparatus 2-1. There is only one image forming apparatus in the system illustrated in FIG. 2. However, if a plurality of image forming apparatuses is arranged in the network system, a different log transmission condition is stored for each image forming apparatus.

In FIG. 4, an error code 4-1 includes a list of codes indicating types of errors controlled by the image forming apparatus 2-1 of the present exemplary embodiment.

A priority log 4-2 indicates a file name of a log file to be transmitted on a priority basis when the error indicated in the error code 4-1 occurs. For example, the priority log corresponding to the error code "E733-0001" is "LOG_PRINTER_*.TXT". In this case, if the error with the error code "E733-0001" occurs, the "LOG_PRINTER_*.TXT" log file is determined as a log file to be transmitted. Herein, log files other than the "LOG_PRINTER_*.TXT" log file, for example, a general log file such as a "LOG_GENERAL_*.TXT" log file may be transmitted.

A transmission target flag 4-3 is used to determine whether to transmit the log file indicated by the priory log 4-2 when such log file is present.

A storage period 4-4 indicates a period for which a log file is stored on the log collection server 2-12. In the present exemplary embodiment, assume that the storage period is "30 days" or "7 days". For example, when the storage period is "30 days", a log file is stored on the log collection server 2-12 for 30 days, and is deleted from the log collection server 2-12 upon lapse of the storage period.

In the example table illustrated in FIG. 4, for example, a log transmission condition in a case where an error with the error code "E733-0001" is occurring defines a policy which includes "LOG_PRINTER_*.TXT" as a log file to be transmitted on a priority basis and 30 days as a storage period.

Moreover, a log transmission condition in a case where an error with the error code "E611-0001" is occurring is registered. In this log transmission condition, "LOG_FAX_*.TXT" is registered as a log to be transmitted on a priority basis, and a storage period of 30 days is registered as a deletion policy to be requested.

In "OTHER" within the error code 4-1, a log transmission condition including a log to be transmitted in a case where an error other than the errors listed in the error code 4-1 is occurring is registered. Even when the image forming apparatus 2-1 is activated, the log file corresponding to the "OTHER" in the error code 4-1 is transmitted.

In the example illustrated in FIG. 4, therefore, when an error not listed within the error code 4-1 is occurring, log files to be transmitted are "LOG_USER_*.TXT" and "LOG_GENERAL_*.TXT". Moreover, these "LOG_USER_*.TXT" and "LOG_GENERAL_*.TXT" log files are used in a case where log files need to be transmitted upon activation of the image forming apparatus 2-1. In the "LOG_USER_*. TXT" and "LOG_GENERAL_*. TXT" files, log transmission conditions with the respective storage periods of 30 days and 7 days as deletion policies are registered.

Moreover, an error code "E001-0001" indicates an error of hardware (a hard error). In the example illustrated in FIG. 4, a log file to be transmitted upon occurrence of the error with the error code "E001-0001" is "N/A" (not applicable). That is, a log transmission condition indicating that a log file should not be transmitted in case of the hard error is registered.

Since the table illustrated in FIG. 4 is merely one example, a content to be registered in the table may be changed. Moreover, the log file and the storage period are also merely examples and not limited to those illustrated in FIG. 4.

Moreover, in the present exemplary embodiment, the log transmission condition is registered for each error code of the image forming apparatus 2-1, the log transmission condition including designation of a log file as a transmission target and designation of a storage period for each log file corresponding to each error code. However, the transmission of the log file is not limited to a case where an error code is detected. As long as a code can indicate a status of the image forming apparatus 2-1, any code can be used. That is, in the table illustrated in FIG. 4, a log transmission condition may be registered for each status of the image forming apparatus 2-1, the log transmission condition including designation of a log as a transmission target and designation of a storage period of each log corresponding to each status.

FIG. 5 is a diagram illustrating one example of a screen used to set the log transmission condition illustrated in FIG. 4.

The screen illustrated in FIG. 5 is a browser screen displayed by a web browser on the PC 2-6 accessing the monitoring server 2-9.

A field 5-2 indicates a uniform resource locator (URL) of a web portal of the monitoring server 2-9. That is, when the URL in the field 5-2 is accessed from the web browser on the PC 2-6, hypertext markup language (HTML) data identified by the URL is transmitted from the monitoring server 2-9 to the web browser, so that a screen 5-1 is displayed by the web browser. This HTML data may be stored on the PC 2-6 instead of the monitoring server 2-9, so that the screen 5-1 can be displayed without receiving the HTML data from the monitoring server 2-9.

When a setting transmission button 5-3 is pressed, the web browser on the PC 2-6 transmits setting data illustrated in fields 5-4 through 5-14, which will be described below, to the monitoring server 2-9. Upon receipt of the setting data, the monitoring server 2-9 generates the log transmission condition illustrated in FIG. 4 based on the setting data, and stores the generated log transmission condition in a storage device such as a hard disk of the monitoring server 2-9. Accordingly, the monitoring server 2-9 transmits the setting data to the image forming apparatus 2-1 according to a request from the image forming apparatus 2-1.

In the image forming apparatus 2-1, the setting data acquired from the monitoring server 2-9 is retained in the HD 1-9 thereof. This setting data is used to control transmission of a log to the log collection server 2-12.

Now, data (the fields 5-4 through 5-14) to be transmitted to the monitoring server 2-9 is described.

The setting field 5-4 is used to determine whether to "TRANSMIT" or "NOT TRANSMIT" a log from the image forming apparatus 2-1 to the log collection server 2-12. If "TRANSMIT" is selected in the log transmission setting field 5-4, transmission of a log from the image forming apparatus 2-1 to the log collection server 2-12 is set. On the other hand, if "NOT TRANSMIT" is selected in the log transmission setting field 5-4, non-transmission of a log file from the image forming apparatus 2-1 to the log collection server 2-12 is set.

The setting field 5-5 is used to set an account so that the log collection server 2-12 is accessed from the image forming apparatus 2-1. The setting field 5-6 is used to set a password corresponding to the account set in the setting field 5-5. The setting field 5-7 is used to set URL to access the log collection server 2-12.

The field 5-8 indicates a list of items designating a transmission condition of a log file, and includes fields 5-9 through 5-14. The setting field 5-9 is used to set a target date (period) on which a log file is transmitted from the image forming apparatus 2-1 to the log collection server 2-12.

The setting field 5-10 is used to determine whether to provide an error filter by selecting "YES" or "NO". If "YES" is selected in the error filter setting field 5-10, the fields 5-11 through 5-14 become valid, and a setting is made such that the transmission of a log file is controlled in the image forming apparatus 2-1 according to the log transmission condition table illustrated in FIG. 4.

On the other hand, if "NO" is selected in the error filter setting field 5-10, the fields 5-11 through 5-14 become invalid, and a setting is made such that log transmission is not controlled in the image forming apparatus 2-1 according to the table illustrated in FIG. 4. For example, when "NO" is selected in the error filter setting field 5-10, logs corresponding to all the errors generated in the image forming apparatus 2-1 are transmitted to the log collection server 2-12.

Hereinafter, a description is given of settings (the fields 5-4 through 5-14) of error filters which become valid when "YES" is selected in the error filter setting field 5-10.

The setting field 5-11 is used to set an error code corresponding to the error code 4-1. If the error corresponding to the error code set in the field 5-11 occurs in the image forming apparatus 2-1, a log file is transmitted.

The setting field 5-12 is used to set a priority log corresponding to the priority log 4-2 illustrated in FIG. 4. The setting field 5-13 is used to set a transmission target corresponding to the transmission target flag 4-3 illustrated in FIG. 4. If "TRANSMIT" is set in the transmission target setting field 5-13, the transmission target flag 4-3 is set to "1". On the other hand, if "NOT TRANSMIT" is set in the setting field 5-13, the transmission target flag 4-3 is set to "0".

The setting field 5-14 is used to set a storage period in the log collection server 2-12. This storage period corresponds to the storage period 4-4 illustrated in FIG. 4. In the present exemplary embodiment, "30 DAYS" or "7 DAYS" can be selected as the storage period.

Assume that the setting data illustrated in FIG. 5 is common to all the image forming apparatuses monitored by the monitoring server 2-9. However, setting data may be set for each image forming apparatus.

If setting data illustrated in FIG. 5 is set for each image forming apparatus, assume that information identifying an image forming apparatus (e.g., a serial number, a mail access control (MAC) address, and an IP address of each image forming apparatus) is set using the screen illustrated in FIG. 5. Accordingly, the image forming apparatus is identified.

FIG. 6 is a diagram illustrating one example of a policy file indicating a deletion policy according to the exemplary embodiment of the present invention.

The policy file illustrated in FIG. 6 is transmitted by the image forming apparatus 2-1 at the time of log transmission, and is registered in a storage device such as a hard disk of the log collection server 2-12. That is, the image forming apparatus 2-1 transmits the policy file illustrated in FIG. 6 when transmitting a log file to the log collection server 2-12. Such an operation is particularly described as follows.

In FIG. 6, a log file list 6-1 indicates log files to be stored in the log collection server 2-12 for 30 days. For example, a file in the log file list 6-1 corresponds to the "LOG_PRINTER_*.TXT" log file to be transmitted from the image forming apparatus 2-1 on a priority bases when an error corresponding to the error code "E733-0001" occurs.

Moreover, files in the log file list 6-1 correspond to the "LOG_USER_*.TXT" log files to be transmitted from the image forming apparatus 2-1 if an error other than the errors listed in the error codes illustrated in FIG. 4 occurs (OTHER).

A log file list 6-2 indicates log files to be stored in the log collection server 2-12 for 7 days. These log files in the log file list 6-2 are deleted from the log collection server 2-12 in a shorter time than those in the log file list 6-1. For example, files in the log file list 6-2 correspond to the "LOG_GENERAL_*.TXT" log files to be transmitted from the image forming apparatus 2-1 when an error other than the errors listed in the error codes in FIG. 4 occurs (OTHER).

A log file not listed in the deletion policy of this policy file can be deleted promptly.

The contents in the policy file illustrated in FIG. 6 are merely examples, and are not limited thereto.

Figure 7:
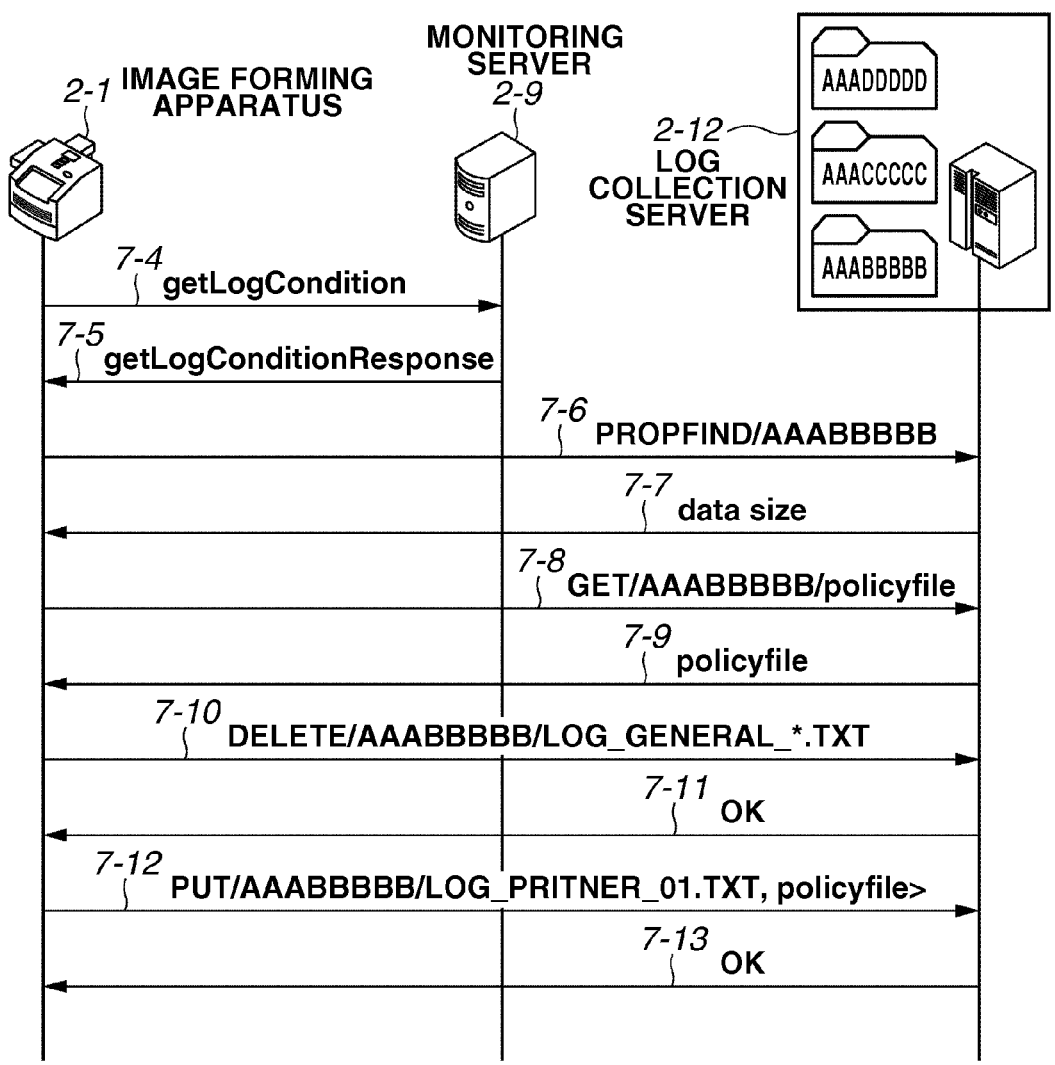
FIG. 7 is a diagram illustrating one example of a communication sequence of a network according to the exemplary embodiment of the present invention.

FIG. 7 is a diagram illustrating one example of a communication sequence of a network according to the exemplary embodiment of the present invention.

In FIG. 7, the image forming apparatus 2-1 is managed by the monitoring server 2-9. The image forming apparatus 2-1 regularly acquires a log transmission condition from the monitoring server 2-9, the log transmission condition serving as a condition for transmitting a log file. Moreover, the image forming apparatus 2-1 transmits a log file to a folder having a folder name with a serial number (herein, "AAABBBBB") thereof according to the log transmission condition acquired from the monitoring server 2-9.

In the log collection server 2-12, a log file is managed by a file system having a hierarchical structure. In the present exemplary embodiment, when the image forming apparatus 2-1 transmits a log file, a serial number of the image forming apparatus 2-1 is transmitted with the log file. Accordingly, a folder having a folder name with this serial number is generated in the log collection server 2-12, and the log file is stored in the generated folder.

Such operations are described in detail below. In step 7-4, the image forming apparatus 2-1 regularly requests the monitoring server 2-9 to provide a transmission condition of a log file (i.e., the error code 4-1 through the storage period 4-4 illustrated in FIG. 4) using a "getLogCondition" request. An example of XML/SOAP data of the "getLogCondition" request is illustrated as data 8-1 in FIG. 8A.

In step 7-5, upon receipt of the "getLogCondition" request, the monitoring server 2-9 replies to the image forming apparatus 2-1 with a setting state (i.e., the setting data 5-4 through 5-14 illustrated in FIG. 5) using "getLogConditionResponse". An example of XML/SOAP data of the "getLogConditionResponse" is illustrated as data 8-2 in FIG. 8B.

In step 7-6, according to the acquired log transmission condition, the image forming apparatus 2-1 requests the log collection server 2-12 to provide attribute information (including total data capacity) of the folder corresponding to the serial number (AAABBBBB) of the image forming apparatus 2-1 using a WebDAV PROPFIND command.

In step 7-7, upon receipt of the WebDAV PROPFIND command, the log collection server 2-12 replies to the image forming apparatus 2-1 with a data size of the folder corresponding to the serial number of the image forming apparatus 2-1.

Subsequently, in step 7-8, the image forming apparatus 2-1 requests the log collection server 2-12 to provide a policy file (FIG. 6) thereof using a GET command (GET/AAABBBBB/policyfile).

In step 7-9, upon receipt of the request using the GET command (e.g., GET/AAABBBBB/policyfile), the log collection server 2-12 replies to the image forming apparatus 2-1 with the policy file (FIG. 6) corresponding to the serial number (AAABBBBB) of the image forming apparatus 2-1.

Subsequently, in step 7-10, the image forming apparatus 2-1 causes the data (log) thereof inside the log collection server 2-12 to be deleted using a DELETE command (e.g., DELETE/AAABBBBB/LOG_GENERAL_*.TXT) according to the deletion policy of the policy file acquired in step 7-9.

In step 7-11, the log collection server 2-12 deletes the data (log) of the image forming apparatus 2-1 according to the DELETE command, and replies to the image forming apparatus 2-1 with a deletion result (e.g., OK) as a response.

Subsequently, in step 7-12, the image forming apparatus 2-1 transmits a new log using a PUT command to the folder (AAABBBBB) corresponding to the serial number thereof inside the log collection server 2-12 according to the log transmission condition acquired in step 7-5, and updates the deletion policy (policy file) of the transmitted data.

In step 7-13, when receiving the log file and the deletion policy file transmitted from the image forming apparatus 2-1, the log collection server 2-12 stores the log file in the folder (AAABBBBB) corresponding to the serial number of the image forming apparatus 2-1, and updates the deletion policy with respect to the log file. The log collection server 2-12 replies to the image forming apparatus 2-1 with a processing result as a response.

In steps 7-11 and 7-13, OK is replied as responses of the respective steps 7-10 and 7-12. However, if an error occurs, NG (no good) is replied.

In the example illustrated in FIG. 7, the sequence of WebDAV is described. However, a protocol such as FTP, SMB, and other unique protocols may be employed. In the example illustrated in FIG. 7, a folder with a serial number of the image forming apparatus 2-1 is provided to identify a log of the apparatus. However, the other identification information such as a MAC address and an IP address of the image forming apparatus 2-1 may be used as long as the apparatus can be uniquely identified.

FIGS. 8A and 8B are diagrams each illustrating one example of XML/SOAP data used to acquire a log setting state according to the exemplary embodiment of the present invention. FIGS. 8A and 8B are hereinafter collectively called FIG. 8.

In FIG. 8, the data 8-1 is an example of the XML/SOAP data of "getLogCondition" illustrated in step 7-4 in FIG. 7. In the present exemplary embodiment, a client identifier (information enclosed by <device> tag in the example of FIG. 8) for identifying the image forming apparatus 2-1 is transmitted together.

The data 8-2 is an example of the XML/SOAP data of "getLogConditionResponse" (illustrated in step 7-5 in FIG. 7) as a response to "getLogCondition" of the data 8-1. This XML data 8-2 contains log transmission ON (available) and a target date (startDate, endDate) as set in FIG. 5. Moreover, the XML data 8-2 contains an error code (errorCode), a target log(file), target/non-target (send), and a storage period (retention) as an error filter (logFilter).

When the image forming apparatus 2-1 communicates with the monitoring server 2-9 for the first time, or when the settings of the fields 5-4 through 5-7 illustrated in FIG. 5 are changed, the information set in the fields 5-4 through 5-7 is included in getLogConditonResponse in spite of the omission in the data 8-1 illustrated in FIG. 8. Moreover, the information set in the fields 5-4 through 5-7 in FIG. 5 may be acquired by the image forming apparatus 2-1 from the monitoring server 2-9 using other sequences.

Although the XML/SOAP is described with reference to FIG. 8, other data structure may be employed. In the XML/SOAP, XML data having the similar meaning as the data illustrated in FIG. 8 can be also employed.

An operation of the image forming apparatus 2-1 of the present invention is described with reference to flowcharts illustrated in FIGS. 9 and 10.

Figure 9:
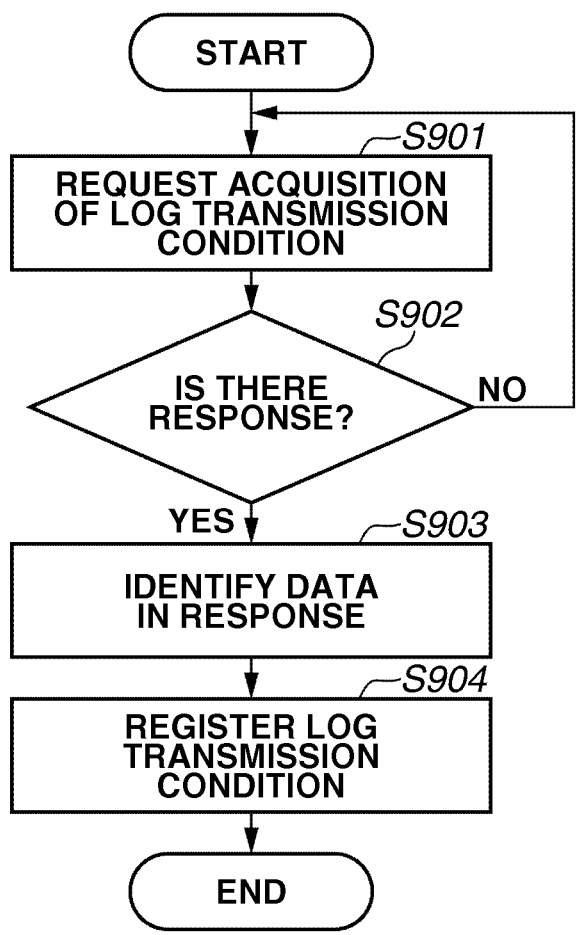
FIG. 9 is a flowchart illustrating one example of processing for setting and registering the log transmission condition in the image forming apparatus.

FIG. 9 is a flowchart illustrating one example of processing for acquiring setting data including a log transmission condition in the image forming apparatus 2-1 according to the exemplary embodiment of the present invention. Assume that each step in the flowchart is performed by executing a computer readable program stored in the ROM 1-3 by the CPU 1-1 of the image forming apparatus 2-1.

In step S901, the CPU 1-1 regularly transmits getLogCondition (the data 8-1 illustrated in FIG. 8) to the monitoring server 2-9 as described in steps 7-4 through 7-5 illustrated in FIG. 7 to request acquisition of a log transmission condition. This processing corresponds to step 7-4 illustrated in FIG. 7.

In step S902, the CPU 1-1 determines whether there is a response (getLogConditionResponse) from the monitoring server 2-9.

If there is no response from the monitoring server 2-9 (NO in step S902), the CPU 1-1 causes the processing to return to step S901.

On the other hand, if there is a response (YES in step S902), the CPU 1-1 causes the processing to proceed to step S903.

In step S903, the CPU 1-1 identifies the data (the data 8-2 illustrated in FIG. 8) described in the response (getLogConditionResponse) from the monitoring server 2-9.

Subsequently, in step S904, the CPU 1-1 extracts the log transmission condition from the data identified in step S903, and registers the log transmission condition as a transmission condition of a log file in a storage device (e.g., the HD 1-9) inside the image forming apparatus 2-1. In a case where the response from the monitoring server 2-9 includes the settings of the fields 5-4 through 5-7 illustrated in FIG. 5, the CPU 1-1 also registers such settings in the storage device (e.g., the HD 1-9) inside the image forming apparatus 2-1. Then, the processing of this flowchart ends.

FIG. 10 is a flowchart illustrating one example of log transmission processing in the image forming apparatus 2-1 according to the exemplary embodiment of the present invention. Assume that each step in the flowchart is performed by executing a computer readable program stored in the ROM 1-3 by the CPU 1-1 of the image forming apparatus 2-1.

The flowchart illustrated in FIG. 10 starts when an abnormal state in the image forming apparatus 2-1 is detected, or when the image forming apparatus 2-1 is activated according to an activation instruction from the user.

In step S1001, the CPU 1-1 monitors a log state of the image forming apparatus 2-1.

In step S1002, the CPU 1-1 determines whether a log file is stored in a storage device (e.g., the HD 1-9) of the image forming apparatus 2-1. If the log file is not stored (NO in step S1002), the CPU 1-1 causes the processing to return to step S1001.

On the other hand, if the log file is stored (YES in step S1002), the CPU 1-1 causes the processing to proceed to step S1003.

In step S1003, the CPU 1-1 identifies a status (e.g., an error code) of the image forming apparatus 2-1.

In step S1004, the CPU 1-1 determines a log file to be transmitted according to the apparatus status identified in step S1003 and to the log transmission condition table registered in step S904 of the flowchart illustrated in FIG. 9.

For example, in a case where a log transmission condition table is the table illustrated in FIG. 4 and an error corresponding to the error code E733-0001 occurs, a priority log corresponding to the error code E733-0001 is "LOG_PRINTER_*.TXT". Consequently, "LOG_PRINTER_*.TXT" stored in the HD 1-9 is determined as a log file to be transmitted.

If a transmission setting is the table illustrated in FIG. 4 and a status identified in step S1003 is the occurrence of an error with the error code "E733-0001", then in step S1004, the CPU 1-1 determines that a priority log is "LOG_PRINTER_*.TXT".

If the error occurrence identified in step S1003 corresponds to an error code not included in the log transmission condition, then in step S1004, the CPU 1-1 determines that priority logs are "LOG_PRINTER_*.TXT" and "LOG_GENERAL_*.TXT".

In step S1005, the CPU 1-1 acquires attribute information (including total data capacity) of the folder corresponding to the serial number of the image forming apparatus 2-1 by providing a PROPFIND command to the log collection server 2-12 as illustrated in steps 7-6 through 7-7 in FIG. 7. That is, the CPU 1-1 acquires a total size of the log files of the image forming apparatus 2-1 from the log collection server 2-12, the log files being stored in the log collection server 2-12. The CPU 1-1 also acquires the deletion policy (FIG. 6) for the image forming apparatus 2-1 from the log collection server 2-12 using the GET command as illustrated in steps 7-8 through 7-9 in FIG. 7 although this acquisition is not illustrated.

In step S1006, the CPU 1-1 acquires a data size of the log files determined to be transmitted in step S1004 (the total size of the log files to be transmitted), and a size of the folder (a total size on a server side) checked in step S1005. Herein, the folder is being allocated to the image forming apparatus 2-1 by the log collection server 2-12. The CPU 1-1 determines whether a total (the sum total) of these acquired sizes exceeds an upper limit value (a first upper limit value) on the log collection server side, the upper limit value being set beforehand. In other words, the CPU 1-1 determines whether all the log files determined to be transmitted in step S1004 can be transmitted to the log collection server 2-12.

Assume that the upper limit value on the log collection server 2-12 side is set beforehand in a storage device (e.g., the HD 1-9) inside the image forming apparatus 2-1. However, the upper limit value may be set in the monitoring server 2-9 from the setting screen illustrated in FIG. 5 such that the image forming apparatus 2-1 can acquire the upper limit value from the monitoring server 2-9.

If the total size exceeds the upper limit value on the log collection server 2-12 side (YES in step S1006), the CPU 1-1 causes the processing to proceed to step S1011.

In step S1011, the CPU 1-1 determines that not all of the log files to be transmitted to the log collection server 2-12 can be transmitted. Accordingly, the CPU 1-1 causes the log files inside the log collection server 2-12 to be deleted using the DELETE command as illustrated in step 7-10 in FIG. 7 according to the deletion policy file acquired in step S1005, the log files being of the image forming apparatus 2-1. Then, the processing proceeds to step S1007.

For example, acquisition of the deletion policy file illustrated in FIG. 6 is described. There are four log files each having a storage period setting of 30 days. These are "LOG_USER_20120101110901.TXT", "LOG_USER_20120101110920.TXT", "LOG_USER_20120101110940.TXT", and "LOG_PRINTER_20120101110950.TXT". As for each of the four log files, a generation date and time thereof is identified by referring to the file name.

The CPU 1-1 determines whether 30 days have elapsed from the generation date and time of each log file by counting. If 30 days have elapsed, the CPU 1-1 determines to delete the log file.

In the present exemplary embodiment, the storage period is counted from the generation date and time of the log file. However, other methods may be employed. For example, a storage period may be counted from a date and time on which a log file is stored in the log collection server 2-12.

On the other hand, if the total size does not exceed the upper limit value on the log collection server 2-12 side (NO in step S1006), the CPU 1-1 causes the processing to proceed to step S1007.

In step S1007, the CPU 1-1 checks the transmission setting (the transmission condition table illustrated in FIG. 4).

In step S1008, the CPU 1-1 determines whether the number of log files to be transmitted exceeds a value set beforehand (a predetermined value) on the image forming apparatus 2-1 side.

For example, assume that the predetermined value of the number of files to be transmitted is set to "5 files", and a "LOG_PRINTER_*.TXT" file is determined as a log file to be transmitted. In this case, five "LOG_PRINTER_*.TXT" files can be maximally transmitted.

Assume that the predetermined value in the image forming apparatus 2-1 is set as a fixed value in a storage device (e.g., the HD 1-9) of the image forming apparatus 2-1. However, the predetermined value may be set as follows. That is, a size obtained by subtracting a folder size (i.e., the size of the folder checked in step S1005, or a size of the folder after deletion of the log files in step S1011) on the server side at this point from the upper limit value on the log collection server side may be used.

If the number of log files to be transmitted does not exceed the predetermined value on the image forming apparatus 2-1 side (NO in step S1008), the CPU 1-1 causes the processing to proceed to step S1009.

In step S1009, the CPU 1-1 transmits all of the stored log files to the log collection server 2-12, and updates the deletion policy file (illustrated in steps 7-12 through 7-13 in FIG. 7). Moreover, the CPU 1-1 deletes the transmitted log files from the HD 1-9 of the image forming apparatus 2-1.

The log files are transmitted using the WebDAV as described above. Herein, a communication channel is encrypted, or data is compressed as needed.

The log files to be transmitted in step S1009 are stored in a hard disk of the log collection server 2-12.

The processing for updating deletion policy file is performed by newly writing file names of the transmitted log files into the deletion policy file. Moreover, in a case where deletion of a log file is requested in step S1011, a file name of the requested log file is deleted from the deletion policy file.

On the other hand, if the number of log files determined to be transmitted in step S1004 exceeds the predetermined value (e.g., 5 files) (YES in step S1008), the CPU 1-1 causes the processing to proceed to step S1010.

In step S1010, the CPU 1-1 transmits log files to the log collection server 2-12 until the predetermined value is reached (e.g., 5 files), and updates the deletion policy file (illustrated in steps 7-12 through 7-13 in FIG. 7). Moreover, the CPU 1-1 deletes the log files transmitted to the log collection server 2-12 from the HD 1-9 of the image forming apparatus 2-1. The deletion policy file is updated by the processing similar to that in step S1009.

That is, the image forming apparatus 2-1 limits transmission of log files when the data volume of log files or the number of log files to be transmitted to the log collection server 2-12 exceeds the predetermined value (or the predetermined number) set on the image forming apparatus 2-1 side. In such a case, the image forming apparatus 2-1 transmits a log file as a log relating to the detected status on a priority basis, the log file being designated as a transmission target (priority log) by the log transmission condition corresponding to the status.

When the deletion policy file is updated in each of steps S1009 and S1010, the following processing is performed. The CPU 1-1 deletes a file name of the log file deleted in step S1011 from the deletion policy file acquired from the log collection server 2-12 in step S1005. Subsequently, the CPU 1-1 newly adds a file name of the log transmitted to the log collection server 2-12 in step S1009 or step S1010 to the deletion policy file, thereby updating the deletion policy file. Then, the CPU 1-1 transmits the updated policy file to the log collection server 2-12.

In step S1011, when the predetermined number of log files is transmitted, the log files may be transmitted in order from "a log having a latest date". Moreover, the log files may be transmitted in order from "a log near the occurrence of an error". That is, assume that the log files are transmitted in order from a log near the occurrence of an error in a priority log (e.g., a log file generated during 3 minutes before and after the time of the error occurrence), and after all the priority logs are transmitted, the other logs are transmitted in order from near the error occurrence. Moreover, a log transmission order may be set in order as follows: a log near the occurrence of an error in a priority log, a log near the occurrence of an error in the other logs, the remaining priority logs, and the remaining other logs.

Moreover, when there is not a transmission target log (a log is not transmitted) such as a case where an occurrence of an error with the error code "E001-0001" is identified in step S1003, an error notification may be transmitted to an administrator by another method (e.g., e-mail).

In the present exemplary embodiment, when the total size of logs exceeds the upper limit value on the server side, the image forming apparatus 2-1 deletes the log file thereof stored in the log collection server 2-12 before transmitting a log file. However, the log file stored in the log collection server 2-12 may be deleted after the image forming apparatus 2-1 transmits the log file.

Therefore, a suitable log file inside the image forming apparatus 2-1 can be transmitted to the log collection server 2-12 to analyze an abnormal state of the image forming apparatus 2-1. Moreover, an unnecessary log can be deleted from the log file stored in the log collection server 2-12, so that only a necessary log file can remain.

Consequently, even when a large amount of logs are generated in a short period of time in the image forming apparatus 2-1, compression of a storage resource of the log collection server 2-12 can be reduced, and a log necessary to analyze a state of the image forming apparatus 2-1 can be stored in the log collection server 2-12 as long as needed.

The present invention is not limited to the image forming apparatus described in the exemplary embodiment. The present invention can be applied to any image forming apparatus as long as the apparatus can be connected to a network.

Moreover, the structures and contents of the above-described various data are not limited thereto. Data may have various structures and contents according to uses and purposes thereof.

The present invention is described with respect to one exemplary embodiment. However, the present invention may be applied an exemplary embodiment as a system, an apparatus, a method, a program, or a storage medium, for example. Particularly, the present invention may be applied to a system including a plurality of devices. Moreover, the present invention may be applied to an apparatus including one device.

The present invention includes all the configurations including a combination of each of the exemplary embodiments.

Moreover, the present invention is provided by executing the following processing. That is, software (program) for causing the above exemplary embodiment to function is supplied to a system or an apparatus via a network or various storage media, and then is read and executed by a computer (or a CPU and a micro-processing unit (MPU)) of the system or the apparatus.

Moreover, the present invention may be applied to a system including a plurality of devices, or an apparatus including one device.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-037145 filed Feb. 23, 2012, which is hereby incorporated by reference herein in its entirety.

What is claimed is:

1. An image forming apparatus communicating with a log collection server via a network, the image forming apparatus comprising:
   a storage device configured to store a plurality of types of log files in each of which a log of the image forming apparatus is written;
   a registration unit configured to register state information identifying an abnormal state of the image forming apparatus as a transmission condition of a log file, wherein the registration unit registers, in association with the transmission condition, type information indicating a type of log file to be transmitted to the log collection server;
   a detection unit configured to detect an abnormal state of the image forming apparatus;
   a determination unit configured to determine whether the information the abnormal state detected by the detection unit corresponds to the abnormal state identified by the state information which is registered as the transmission condition of the log file, wherein, in a case where the determination unit has determined that the abnormal state detected by the detection unit corresponds to the abnormal state identified by the state information which is registered as the transmission condition of the log file, the determination unit further determines, from among the plurality of types of log files stored in the storage device, a log file of which type corresponds to the type indicated by the type information registered by the registration unit as the type of log file to be transmitted to the log collection server; and
   a transmission unit configured to transmit the log file determined by the determination unit to the log collection server,
   wherein the transmission unit is configured not to transmit, among the plurality of types of log files stored in the storage device, a log file not determined by the determination unit to the log collection server in a case where the determination unit has determined that the abnormal state detected by the detection unit corresponds to the abnormal state identified by the state information which is registered as the transmission condition.

2. The image forming apparatus according to claim 1, wherein the state information identifying the abnormal state is an error code.

3. The image forming apparatus according to claim 2, wherein the registration unit registers a storage period of the log file by associating with the error code, and
   wherein, when the storage period of the log file elapses, the log file being stored in the log collection server, the transmission unit further transmits to the log collection server a request for deletion of the log file.

4. The image forming apparatus according to claim 1, wherein the transmission unit transmits the log file stored in the storage device, and transmits a serial number of the image forming apparatus, the serial number being used as a folder name to manage the log file.

5. The image forming apparatus according to claim 1, wherein the plurality of types of log files includes a log file relating to usage of a facsimile apparatus.

6. The image forming apparatus according to claim 1, wherein the plurality of types of log files includes a log file relating to setting changes in the image forming apparatus.

7. The image forming apparatus according to claim 1, wherein the plurality of types of log files includes a log file of transmitting/receiving packets to flow via a network.

8. The image forming apparatus according to claim 1, wherein the plurality of types of log files includes a log file in which a log of an application installed in the image forming apparatus is written.

9. A control method for an image forming apparatus communicating with a log collection server via a network, the control method comprising:
   storing a plurality of types of log files, in each of which a log of the image forming apparatus is written;
   registering state information identifying an abnormal state of the image forming apparatus as a transmission condition of a log file and registering, in association with the transmission condition, type information indicating a type of log file to be transmitted to the log collection server;
   detecting an abnormal state of the image forming apparatus;
   determining whether the detected abnormal state corresponds to the abnormal state identified by the state information, and in a case where the detected abnormal state is determined to correspond to the abnormal state identified by the state information, further determining, from among the plurality of types of log files stored in the storage device, a log file of which type corresponds to the type indicated by the information as the type of log file to be transmitted to the log collection server; and
   transmitting the log file of which type corresponds to the type indicated by the type information to the log collection server,
   wherein a log file that has state information that identifies the abnormal state of the image forming apparatus as a transmission condition of the log file is not transmitted to the log collection server in a case where the log file is not determined to be of which type corresponds to the type indicated by the type information.

10. A non-transitory computer-readable storage medium storing a program for causing an image forming apparatus communicating with an log collection server via a network to execute a method comprising:
    storing a plurality of types of log files, in each of which a log of the image forming apparatus is written;
    registering state information identifying an abnormal state of the image forming apparatus as a transmission condition of a log file and registering, in association with the transmission condition, type information indicating a type of log file to be transmitted to the log collection server;
    detecting an abnormal state of the image forming apparatus;
    determining whether the detected abnormal state corresponds to the abnormal state identified by the state information, and in a case where the detected abnormal state is determined to correspond to the abnormal state identified by the state information, further determining, from among the plurality of types of log files stored in the storage device, a log file of which type corresponds to the type indicated by the type of information as the type of log file to be transmitted to the log collection server; and
    transmitting the log file of which type corresponds to the type indicated by the type information to the log collection server,
    wherein a log file that has state information that identifies the abnormal state of the image forming apparatus as a transmission condition of the log file is not transmitted to the log collection server in a case where the log file is not determined to be of which type corresponds to the type indicated by the type information.

* * * * *